US012646794B2

(12) United States Patent
Min

(10) Patent No.: US 12,646,794 B2
(45) Date of Patent: Jun. 2, 2026

(54) DANGER SENSING BATTERY CELL

(71) Applicant: LG Chem, Ltd., Seoul (KR)

(72) Inventor: Kyoung Choon Min, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 978 days.

(21) Appl. No.: 17/425,165

(22) PCT Filed: Apr. 22, 2020

(86) PCT No.: PCT/KR2020/005286
§ 371 (c)(1),
(2) Date: Jul. 22, 2021

(87) PCT Pub. No.: WO2020/226303
PCT Pub. Date: Nov. 12, 2020

(65) Prior Publication Data
US 2022/0102806 A1 Mar. 31, 2022

(30) Foreign Application Priority Data
May 3, 2019 (KR) ........................ 10-2019-0052388

(51) Int. Cl.
*H01M 50/367* (2021.01)
*H01M 10/48* (2006.01)
*H01M 50/105* (2021.01)

(52) U.S. Cl.
CPC ......... *H01M 50/367* (2021.01); *H01M 10/48* (2013.01); *H01M 10/486* (2013.01);
(Continued)

(58) Field of Classification Search
CPC .. H01M 50/367; H01M 50/105; H01M 10/48; H01M 10/486; H01M 10/488; H01M 2200/20
See application file for complete search history.

(56) References Cited

U.S. PATENT DOCUMENTS

2004/0197624 A1* 10/2004 Wheat ..................... C01B 3/382
700/282
2006/0051631 A1* 3/2006 Kim .................. H01M 8/04208
429/492
(Continued)

FOREIGN PATENT DOCUMENTS

CN 101512821 A 8/2009
CN 103682503 A 3/2014
(Continued)

OTHER PUBLICATIONS

International Search Report for Application No. PCT/KR2020/005286 mailed Jul. 24, 2020, pp. 1-2.
(Continued)

*Primary Examiner* — Brian R Ohara
*Assistant Examiner* — Emily Elizabeth Freeman
(74) *Attorney, Agent, or Firm* — Lerner David LLP

(57) ABSTRACT
Disclosed is battery cell including a reception unit of a battery case having an electrode assembly and an electrolytic solution received therein, a gas storage unit disposed outside the reception unit, a storage space in the gas storage unit being partitioned into two or more sections, and a sensor, wherein a signal is sensed by the sensor when the two or more sections of the gas storage unit are filled with gas. In the case in which the sensed signal deviates from a predetermined value, an alarm member signals danger, whereby an accident is prevented.

19 Claims, 5 Drawing Sheets

(52) U.S. Cl.
CPC ....... *H01M 10/488* (2013.01); *H01M 50/105*
(2021.01); *H01M 2200/20* (2013.01)

(56) References Cited

U.S. PATENT DOCUMENTS

| | | | |
|---|---|---|---|
| 2006/0076926 A1 | 4/2006 | Lee | |
| 2007/0154794 A1 | 7/2007 | Kim et al. | |
| 2009/0220851 A1* | 9/2009 | Nakazawa | H01M 50/30 |
| | | | 429/58 |
| 2010/0239895 A1 | 9/2010 | Yang et al. | |
| 2011/0151292 A1 | 6/2011 | Song | |
| 2012/0171599 A1* | 7/2012 | Kishida | H01M 8/2465 |
| | | | 429/73 |
| 2012/0196161 A1* | 8/2012 | Yang | H01M 50/55 |
| | | | 429/53 |
| 2014/0023887 A1 | 1/2014 | Lim | |
| 2014/0065448 A1 | 3/2014 | Ahn et al. | |
| 2016/0111693 A1* | 4/2016 | Reitzle | H01M 10/486 |
| | | | 429/94 |
| 2016/0211502 A1* | 7/2016 | Choi | H01M 50/3425 |
| 2017/0222197 A1 | 8/2017 | Sawada et al. | |
| 2018/0047972 A1 | 2/2018 | Chung et al. | |
| 2018/0123200 A1* | 5/2018 | Golubkov | H01M 10/045 |
| 2018/0183027 A1 | 6/2018 | Lee et al. | |
| 2019/0280325 A1* | 9/2019 | Jung | H01M 10/0481 |
| 2020/0067036 A1 | 2/2020 | Sawada et al. | |
| 2021/0111443 A1* | 4/2021 | Wang | H01M 10/4207 |

FOREIGN PATENT DOCUMENTS

| | | | |
|---|---|---|---|
| CN | 106537639 | A | 3/2017 |
| CN | 107735883 | A | 2/2018 |
| JP | 2007213873 | A | 8/2007 |
| JP | 2010503150 | A | 1/2010 |
| JP | 2012243556 | A | 12/2012 |
| JP | 2016152231 | A | 8/2016 |
| KR | 100824897 | B1 | 4/2008 |
| KR | 20110072733 | A | 6/2011 |
| KR | 20150061836 | A | 6/2015 |
| KR | 101600138 | B1 | 3/2016 |
| KR | 20160066909 | A | 6/2016 |
| KR | 20170040919 | A | 4/2017 |
| KR | 20170043926 | A | 4/2017 |
| KR | 20170050926 | A | 5/2017 |
| KR | 101748362 | B1 | 6/2017 |
| KR | 20170118448 | A | 10/2017 |
| KR | 101930086 | B1 | 12/2018 |
| WO | 2016009989 | A1 | 1/2016 |

OTHER PUBLICATIONS

Search Report of European Application No. 20802360.6 dated Sep. 28, 2021. 2 pgs.

* cited by examiner

【FIG. 1】
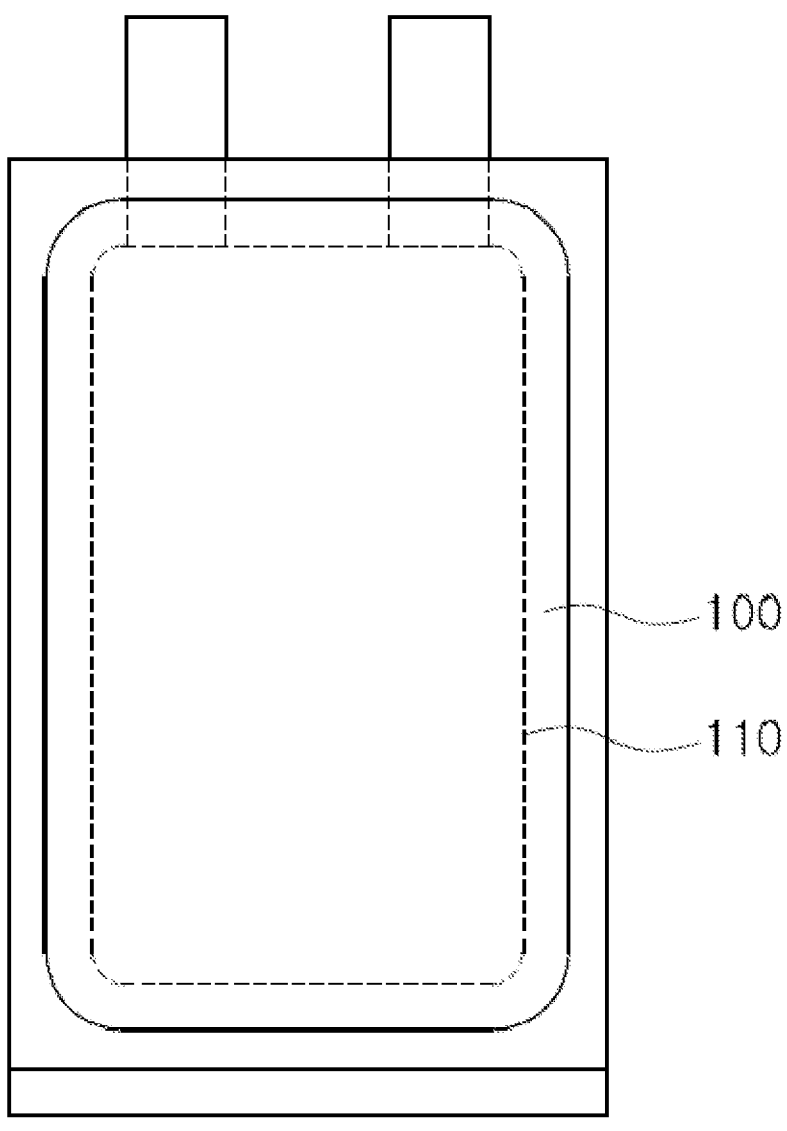
100
110

【FIG. 2】
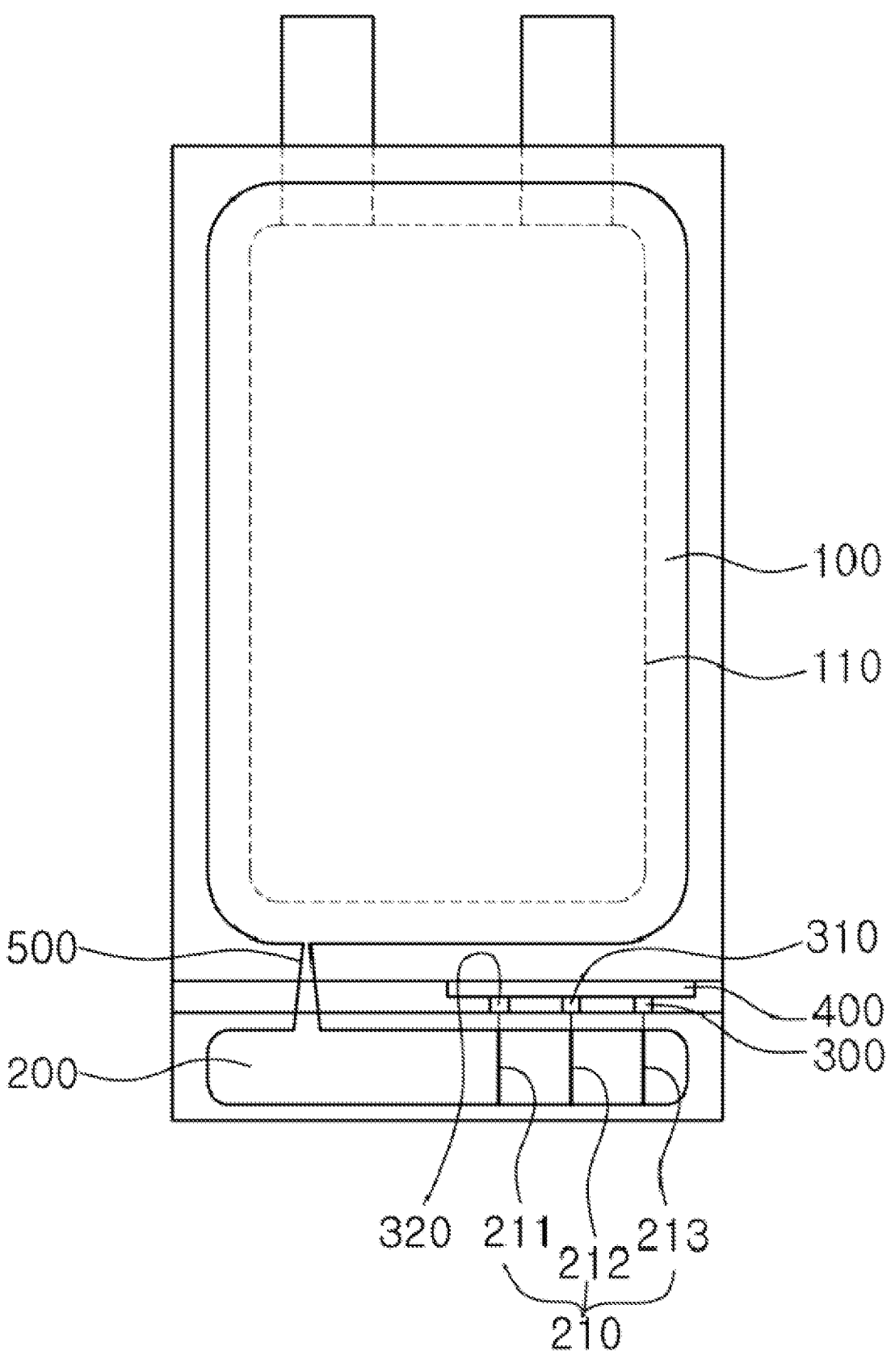

【FIG. 3】
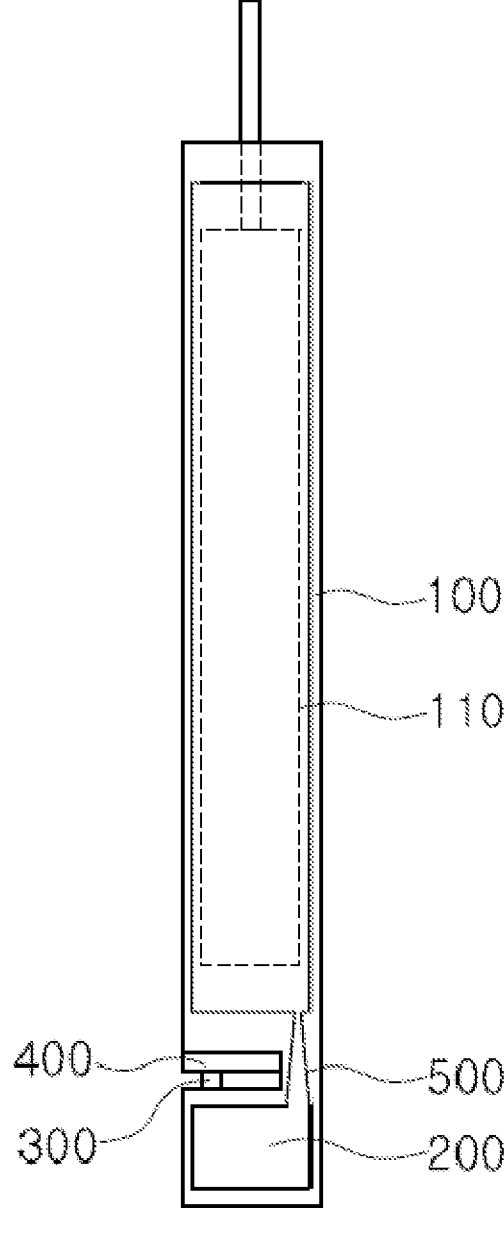

【FIG. 4】
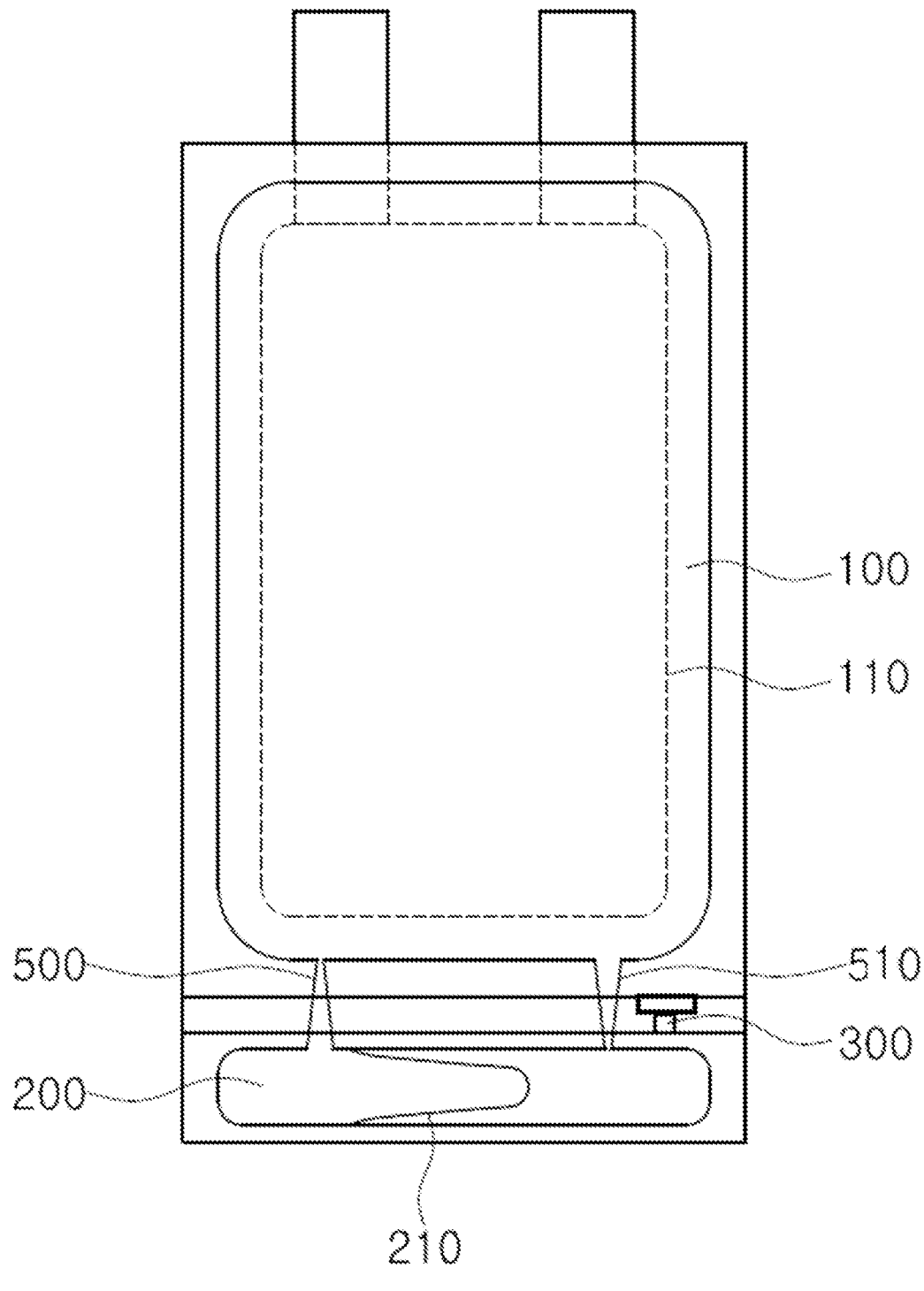

【FIG. 5】
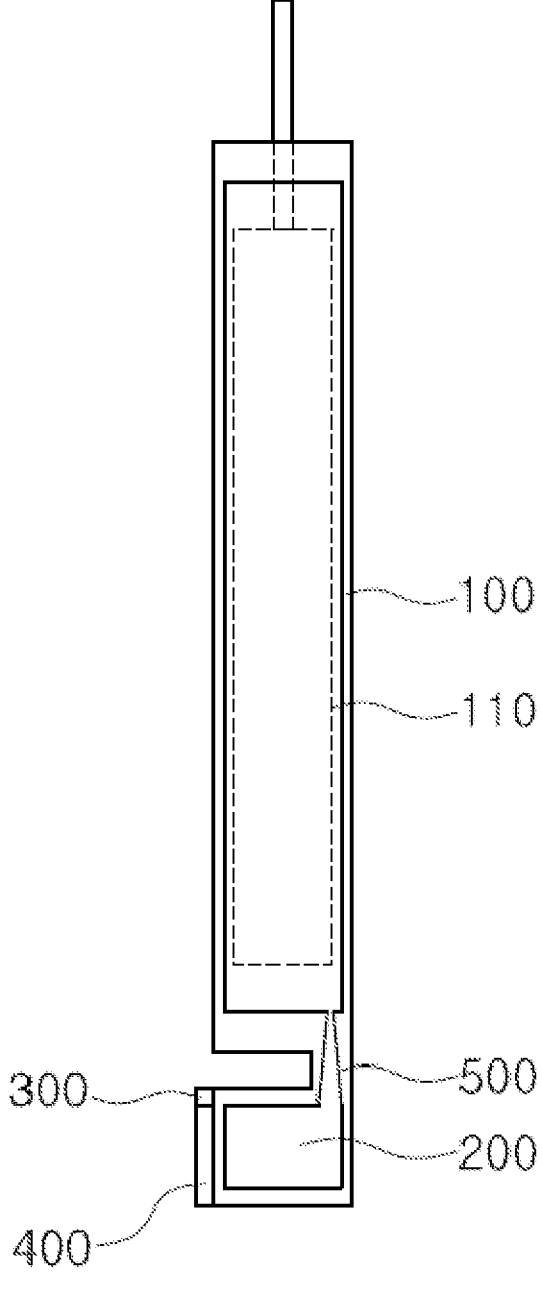

1

DANGER SENSING BATTERY CELL

CROSS-REFERENCE TO RELATED APPLICATIONS

This application is a national phase entry under 35 U.S.C. § 371 of International Patent Application No. PCT/KR2020/005286, filed on Apr. 22, 2020, published in Korean, which claims priority from Korean Patent Application No. 2019-0052388 filed on May 3, 2019, the disclosures of which are hereby incorporated herein by reference in their entireties.

TECHNICAL FIELD

The present invention relates to a danger sensing battery cell, and more particularly to a battery cell including a gas storage unit having two or more gas storage spaces and a sensor provided at the outer surface of the gas storage unit.

BACKGROUND ART

In recent years, interest in storage and use of energy has increased due to depletion of resources and demand for various kinds of energy. As a result, demand for a high-energy, high-density battery has also increased. However, such a battery has a danger of combustion and explosion of the battery due to short circuit in the battery. Particularly, in the case in which gas is generated in the battery during charging and discharging of the battery, the battery may generate heat or explode due to malfunction of the battery, and in the case in which a battery case breaks, noxious gas and chemical substance may leak from the battery case.

In order to improve safety of the battery, the battery is provided with a safety device, such as a fuse or a protection circuit. In recent years, a scheme for discharging gas from the battery has been considered. However, there is no device capable of measuring noxious gas in the battery and predicting when danger will occur before the occurrence of an accident, whereby it is not possible to prevent an accident due to stop in function of the battery in addition to generation of heat from the battery and explosion of the battery.

Korean Patent Application Publication No. 10-2011-0072733 (Jun. 29, 2001) (Prior Art Document 1) discloses a secondary battery capable of easily discharging gas therefrom, whereby the thickness of the battery is reduced, wherein the secondary battery includes a gas passage, through which gas is introduced, and a gas chamber 130. However, this prior art document is different from the present invention in that such a battery chamber is not partitioned and a sensor configured to measure the internal state of the battery cell and, when deviation from a predetermined region occurs, to inform of such occurrence is not provided.

Korean Patent Application Publication No. 10-2017-0040919 (Apr. 14, 2017) (Prior Art Document 2) discloses a battery module including a probe configured to sense expansion of a battery cell, wherein the battery module includes a sensing probe configured to sense a change in local volumetric expansion of the battery cell and to transmit a signal. However, this prior art document is different from the present invention in that the battery cell does not include a separate gas storage unit configured to store gas.

Korean Patent Application Publication No. 10-2015-0061836 (Jun. 5, 2015) (Prior Art Document 3) is similar to the present invention in that a passage, through which gas and an electrolytic solution are discharged, is provided as a gas pocket. However, Prior Art Document 3 is different from the present invention in that gas and an electrolytic solution in a pouch are controlled during a degassing process performed to discharge gas generated at the time of initial charging and discharging through an activation process.

Korean Patent Application Publication No. 10-2017-0050926 (May 11, 2017) (Prior Art Document 4) is similar to the present invention in that a gas discharge unit configured to guide the discharge of gas and a sensing unit configured to sense displacement generated in the gas discharge unit and to generate an electrical signal are provided, but is different from the present invention in that a separate gas storage unit is not provided.

Therefore, the construction for, when a partitioned gas storage unit and gas deviate from a predetermined region, sensing such deviation such that a user prevents danger in advance has not yet been proposed.

PRIOR ART DOCUMENT

Patent Document

Korean Patent Application Publication No. 10-2011-0072733 (Jun. 29, 2011)

Korean Patent Application Publication No. 10-2017-0040919 (Apr. 14, 2017)

Korean Patent Application Publication No. 10-2015-0061836 (Jun. 5, 2015)

Korean Patent Application Publication No. 10-2017-0050926 (May 11, 2017)

DISCLOSURE

Technical Problem

The present invention has been made in view of the above problems, and it is an object of the present invention to provide a battery cell capable of sensing danger thereof in advance.

Technical Solution

In order to accomplish the above object, the present invention provides a battery cell configured such that an electrode assembly is received in a reception unit of a battery case together with an electrolytic solution, wherein a gas storage unit configured to store gas generated in the battery cell is formed outside the reception unit, and a partitioning means configured to partition a space defined in the gas storage unit into two or more sections is provided in the gas storage unit.

The battery case may have a first sealed portion formed by thermally fusing the outer circumferential surface of the battery case in the state in which the electrode assembly and the electrolytic solution are received in the battery case.

A second sealed portion may be formed between the reception unit and the gas storage unit.

The second sealed portion may be provided with a first one-way valve configured to guide the gas in the battery cell to the gas storage unit when the gas expands to a predetermined pressure or higher.

The gas storage unit may be provided at the outer surface thereof with a sensor configured to sense a signal based on each of the partitioning means.

The sensor may be at least one of a contact sensor, a pressure sensor, and a temperature sensor.

In the case in which a first section in the gas storage unit is filled with gas, this may be sensed by the sensor mounted to the first section, in the case in which an (N–1)-th section set as a dangerous level is filled with the gas, this may be sensed by the sensor mounted to the (N–1)-th section, and in the case in which a last section is filled with the gas, the gas may be discharged to stop the function of the battery.

The sensor may be connected to an alarm member, and in the case in which the signal deviates from a predetermined value, the sensor may transmit the signal to the alarm member.

The partitioning means may be made of a material configured to be more easily damaged than the outer wall of the battery cell when the partitioning means is expanded by gas.

The partitioning means may be made of a material configured to be more easily deformed than the outer wall of the battery cell when the partitioning means is expanded by gas.

The battery cell may further include a reduction portion configured not to allow gas to be introduced thereinto and configured such that the volume of a space therein is reduced due to deformation of the partitioning means.

A second one-way valve configured to move a material from the reduction portion to the reception unit may be provided in the second sealed portion.

The reduction portion before generation of gas may have a larger volume than an expansion portion configured such that the volume thereof is increased due to deformation of the partitioning means when the gas is introduced thereinto.

The present invention provides a battery pack including the battery cell.

In addition, the present invention provides a device including the battery pack as a power source.

In addition, the device may be a mobile electronic device, a power tool driven by a battery-powered motor, an electric automobile, such as an electric vehicle (EV), a hybrid electric vehicle (HEV), or a plug-in hybrid electric vehicle (PHEV), an electric two-wheeled vehicle, such as an electric bicycle (E-bike) or an electric scooter (E-scooter), an electric golf cart, or a power storage system.

In the present invention, one or more constructions that do not conflict with each other may be selected and combined from among the above constructions.

DESCRIPTION OF DRAWINGS

FIG. 1 is a plan view of a conventional pouch-shaped battery cell.

FIG. 2 is a plan view of a pouch-shaped battery cell including a gas storage unit and a partitioning means according to the present invention.

FIG. 3 is a side view of the pouch-shaped battery cell including the gas storage unit and the partitioning means according to the present invention.

FIG. 4 is a plan view of a pouch-shaped battery cell further including an injection unit in addition to the gas storage unit and the partitioning means according to the present invention.

FIG. 5 is a side view of the pouch-shaped battery cell further including the injection unit in addition to the gas storage unit and the partitioning means according to the present invention.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

Embodiments of the present invention will be described in detail with reference to the drawings.

FIG. 1 is a plan view of a conventional pouch-shaped battery cell, FIG. 2 is a plan view of a pouch-shaped battery cell including a gas storage unit and a partitioning means according to the present invention, and FIG. 3 is a side view of the battery cell of FIG. 2. In addition, FIG. 4 is a plan view of a pouch-shaped battery cell further including an injection unit in addition to the gas storage unit and the partitioning means according to the present invention, and FIG. 5 is a side view of the battery cell of FIG. 4.

As shown in FIG. 1, the conventional pouch-shaped battery cell has a shape in which the circumference of a reception unit 100 configured to receive an electrode assembly 110 is sealed. As a result, the conventional battery cell has a problem in that sealing of the reception unit becomes weak or the reception unit ruptures due to gas generated when the electrode assembly 110 is operated. In order to prevent this, a shape in which a gas storage unit configured to store gas is provided may be considered. However, this is a pocket form capable of receiving gas, and does not serve to inform of danger of the battery cell due to generation of the gas in advance.

In contrast, as shown in FIG. 2, the pouch-shaped battery cell according to the present invention includes a gas storage unit 200 provided outside a reception unit 100 configured to receive an electrode assembly 110. The gas storage unit 200 has a partitioning means 210 configured to partition the gas storage unit 200 into predetermined sections.

The reception unit 100 is formed in a shape in which the outer circumference of the reception unit is thermally fused in the state in which the electrode assembly 110 and an electrolytic solution are received therein. The reception unit 100 is formed by deforming a laminate sheet. The reception unit 100 is configured in a shape in which a space configured to allow the electrode assembly 110 to be seated therein protrudes when viewed from outside.

The gas storage unit 200 may be formed by deforming the laminate sheet, in the same manner as the reception unit 100, such that a predetermined space, i.e. a protruding space, is formed, or may be formed using a method of not sealing a portion corresponding to the gas storage unit 200 at the time of forming a sealed portion.

The gas storage unit 200 and the reception unit 100 are separated from each other in the state in which a sealed portion is also formed therebetween. The sealed portion between the gas storage unit 200 and the reception unit 100 serves to prevent movement of materials between the reception unit 100 and the gas storage unit 200. A first one-way valve 500 may be provided in the sealed portion between the gas storage unit 200 and the reception unit 100 such that only gas is movable.

In the battery cell according to the present invention, a signal transmission method may differ depending on the shape of the gas storage unit 200. As an example, in the case in which the gas storage unit 200 is constituted by a protruding space as described above, a signal may be transmitted by recognizing damage to the partitioning means 210 provided in the gas storage unit 200, or a signal generated by a pressure difference or a potential difference may be transmitted. Also, in the case in which the gas storage unit 200 is simply configured as a portion that is not sealed while not protruding, the degree of expansion of the gas storage unit 200 may be determined, whereby a signal may be transmitted, although a signal may be transmitted based on a pressure difference or a potential difference. The present invention is not limited to the above illustration, and various methods capable of sensing a change due to gas in the gas storage unit 200 may be used.

The gas storage unit 200 is located outside the reception unit 100, and the position of the gas storage unit in the battery cell is not restricted as long as the gas storage unit is connected to the reception unit 100. That is, the gas storage unit may be located on any of a lateral side, a lower side, and an upper side of the reception unit 100. However, the upper side of the reception unit 100 is not preferable in that electrode leads protrude from the upper side of the reception unit, whereby it is not easy to form a gas storage space. Also, in the case in which the gas storage unit 200 is used as an automatic electrolytic solution injector, the gas storage unit 200 may be disposed on the lower side of the reception unit in order to prevent injection of the electrolytic solution using gravity.

The battery cell according to the present invention is applicable to all batteries in which gas is generated as the result of operation thereof and thus may also be used in not only a battery using an electrolytic solution but also an all-solid-state battery using a solid electrolyte instead of a separator.

The partitioning means 210, which is configured to partition the gas storage space into two or more sections, is provided in the gas storage unit 200. The number of partitioning means 210 is not restricted as long as the partitioning means 210 are capable of partitioning the gas storage space in the gas storage unit 200. Preferably, one or more partitioning means are provided in order to achieve the purpose of partitioning. In addition, it is appropriate for the number of partitioning means 210 to be 7 or less in consideration of the size and function of the gas storage unit 200. When partitioning means 210 are broken or deformed, sensors 300, 310, and 320 connected to the partitioning means 210 sense signals generated from the partitioning means 210, and the sensed signals are transmitted to an alarm member 400, which transmits an alarm to a user.

The partitioning means 210 may be made of the same material as a pouch, and the material for the partitioning means may have a different seal degree from the material for the pouch or may be more easily damaged than the material for the pouch. In addition, the respective partitioning means 210 may be made of different materials, and each of the partitioning means 210 may be configured in a structure having elasticity, by which a portion of the partitioning means is moved and then restored when predetermined pressure is applied thereto. This may differ depending on the size and shape of the battery cell and the sensitivity and shape of the sensors 300, 310, and 320. In addition, as shown in FIG. 4, the partitioning means 210 may be expanded or deformed.

The size of the partitioning means 210 may differ depending on the function of each of the partitioning means 210. In the case in which the gas storage unit 200 stores only gas, the first partitioning means 211 may be located at a point corresponding to ⅔ of the gas storage unit 200, whereby the space of the portion into which gas is introduced may be larger and the sections provided behind the first partitioning means 211 may be smaller. However, for a battery cell configured such that a material, such as an electrolytic solution, is moved into the reception unit 100, as shown in FIG. 4, the first partitioning means 210 may be located at a point corresponding to ⅓ of the gas storage unit, whereby the space of the portion into which gas is introduced may be smaller than the section in which the material is located. Consequently, the position of each of the partitioning means 210 in the gas storage unit 200 may differ depending on the function thereof.

The distances between the partitioning means 210 may be equal to or different from each other depending on the function of the partitioning means 210. In addition, the distances between the partitioning means 210 may be changed depending on pressure applied to the partitioning means 210. However, the sum of the distances between the partitioning means 210 must not exceed ½ the size of the gas storage unit 200.

In the case in which a pressure of 200 kgf is applied to the first partitioning means 211, a pressure of 350 kgf is applied to the second partitioning means 212, and a pressure of 500 kgf is applied to the third partitioning means 213, each of the partitioning means 210 may be broken or opened, whereby a signal may be transmitted to the sensor 300. This is based on a change in pressure due to overcharging. The first partitioning means 211 may inform of a signal generated at the time of abnormal charging or overcharging, and the second partitioning means 212 may inform of whether the abnormal state continues. In addition, the third partitioning means 213 may inform of a possibility of combustion and explosion of the cell. In the case in which pressure further increases at the rear of the third partitioning means 213, a signal may be sensed, whereby the function of the battery may be stopped. The function of the partitioning means 210 may be added or changed depending on the number of partitioning means 210. Basically, however, the partitioning means 210 serve to inform the user of whether the cell is abnormal. Also, in the case in which the cell is abnormal, the pressure applied to the partitioning means may be changed depending on the pressure applied to the battery cell.

The function of the battery may be stopped using a method of interrupting the supply of current to the battery, a method of adding a material configured to disturb the function of the battery, or a method of introducing such a material into the battery. However, all methods capable of stopping the function of the battery may be used.

The kind of the sensors 300, 310, and 320 is not restricted as long as the sensors are capable of sensing a change in the partitioning means 210. As an example, each of the sensors 300, 310, and 320 may be a contact sensor, a pressure sensor, or a temperature sensor. However, the present invention is not limited thereto. A change in the partitioning means 210 may be sensed using different kinds of sensors 300, 310, and 320. Preferably, however, the same kind of sensors are used to sense a change in the partitioning means for convenience in manufacture.

Each of the sensors 300, 310, and 320 senses a signal and transmits abnormality to the alarm member 400 in the case in which the signal indicates a predetermined value or higher. Alarm generated by the alarm member 400 may be not only an audible alarm, such as a sound alarm, but also a visual alarm, such as an alarm using a flasher, a navigator, or a display. The alarm member 400 may provide an alarm received from a BMS, or may provide an alarm in the state of being connected to the battery.

The position of the sensors 300, 310, and 320 and the alarm member 400 is not restricted as long as the above components are capable of sensing a change generated in the partitioning means 211, 212, and 213 and transmitting the sensed change. In order to increase density of the battery, however, the above components may be located in a space defined by the sealed portion between the reception unit 100 and the gas storage unit 200, as shown in FIG. 3, or may be located in a portion configured to be expanded by a change in the gas storage unit 200 in order to measure pressure change above the gas storage unit 200 and to transmit the measured pressure, as shown in FIG. 5.

One-way valves 500 and 510 are used to move gas or a desired material, such as an electrolytic solution, only in a predetermined direction. The one-way valves 500 and 510 may be configured to move gas generated in the reception unit 100 only to the gas storage unit 200, as shown in FIG. 2, or may be configured to move a material in the gas storage unit 200, such as an electrolytic solution, to the reception unit 100, as shown in FIG. 4.

As can be seen from FIG. 4, the partitioning means 210 may be used to provide a material that is consumed as the result of use of the battery, such as an electrolytic solution, to the battery. The partitioning means 210 is expanded or moved by gas introduced through the first one-way valve 500. Subsequently, the pressure of the portion including the material that is consumed, such as an electrolytic solution, is increased by the expansion or movement of the partitioning means 210. As a result, the material that is consumed moves through the second one-way valve 510 connected to the portion including the material that is consumed. That is, the partitioning means 210 is operated based on gravity and a change in pressure due to gas that is generated. In a general case, the electrolytic solution is present in the gas storage unit 200 due to force, such as gravity, and when gas is generated, the electrolytic solution is moved to the reception unit 100 through the second one-way valve 510. The gas storage unit 200 may be located on the lateral side or the upper side of the reception unit in order to uniformly distribute the electrolytic solution as long as the electrolytic solution is movable only in one direction through the second one-way valve 510. Preferably, however, the gas storage unit is located on the lower side of the reception unit in order to prevent the electrolytic solution from being moved before gas is generated. Of course, the gas storage unit 200 may be located on each of the lower side and the opposite lateral sides of the reception unit.

When the partitioning means 210 of the battery reaches a predetermined portion, e.g. the outermost partitioning means located adjacent to the outer surface of the battery case corresponding to the portion including the material that is consumed, movement of the partitioning means is sensed by the sensor 300. The sensor 300 may transmit the signal to the alarm member as a danger signal or a signal indicating whether to stop the battery, or may stop the function of the battery upon sensing the signal.

A person having ordinary skill in the art to which the present invention pertains will appreciate that various applications and modifications are possible based on the above description without departing from the scope of the present invention.

DESCRIPTION OF REFERENCE NUMERALS

100: Reception unit
110: Electrode assembly
200: Gas storage unit
210: Partitioning means
211: First partitioning means
212: Second partitioning means
213: Third partitioning means
300, 310, 320: Sensors
400: Alarm member
500: First one-way valve
510: Second one-way valve

INDUSTRIAL APPLICABILITY

As is apparent from the above description, a battery cell according to the present invention is capable of informing of the state of a battery before the function of the battery is stopped or an accident, such as explosion of the battery, occurs by the provision of gas storage spaces partitioned in a gas storage unit.

Prior inventions merely disclose the construction of discharging gas from a battery or the construction informing of the expansion of a battery case due to gas. In the present invention, however, it is possible to provide a signal to a battery user depending on the degree of gas generation by the provision of the partitioned gas storage spaces, whereby it is possible to prepare for an accident due to the battery.

The invention claimed is:
1. A battery cell, comprising:
a battery case;
an electrode assembly received in a reception unit of the battery case together with an electrolytic solution;
a gas storage unit configured to store gas generated in the battery cell, the gas storage unit being formed outside the reception unit, and
first and second partitioning walls that partition a space defined in the gas storage unit into three or more sections, the first and second partitioning walls being provided in the gas storage unit,
wherein the first partitioning wall is configured to rupture when a gas pressure in a first one of the three or more sections in the gas storage unit exceeds a first limit pressure, and the first partitioning wall does not comprise an opening prior to rupture,
wherein the second partitioning wall is configured to rupture when a gas pressure in a second one of the three or more sections in the gas storage unit exceeds a second limit pressure greater than the first limit pressure, and the second partitioning wall does not comprise an opening prior to rupture,
wherein the gas storage unit is disposed at an outer surface of the battery case and has first and second sensors each configured to generate a signal based on deformation or rupture of the first and second partitioning walls, respectively, and
wherein each of the first and second sensors is at least one of a contact sensor or a pressure sensor.
2. The battery cell according to claim 1, wherein the battery case has a first sealed portion formed by thermally fusing an outer circumferential surface of the battery case, wherein the electrode assembly and the electrolytic solution are received in the battery case.

3. The battery cell according to claim 1, wherein the battery case has a second sealed portion formed between the reception unit and the gas storage unit.

4. The battery cell according to claim 3, wherein the second sealed portion has a first one-way valve configured to guide the gas in the battery cell to the gas storage unit when the gas expands to a pressure that is greater than or equal to a predetermined pressure.

5. A battery cell, comprising:

a battery case;

an electrode assembly received in a reception unit of the battery case together with an electrolytic solution;

a gas storage unit configured to store gas generated in the battery cell, the gas storage unit being formed outside the reception unit, and first and second partitioning walls that partition a space defined in the gas storage unit into three or more sections, the first and second partitioning walls being provided in the gas storage unit, wherein the gas storage unit is disposed at an outer surface of the battery case and has first and second sensors each configured to generate a signal based on deformation or rupture of the first and second partitioning walls, respectively, and the partitioning wall does not comprise an opening prior to rupture, and wherein each of the first and second sensors is at least one of a contact sensor or a pressure sensor.

6. The battery cell according to claim 5, wherein in a case in which a first section in the gas storage unit is filled with the gas, reaching of a first pressure boundary is sensed by the sensor mounted to the first section, in a case in which an (N–1)-th section set as a dangerous level is filled with the gas, reaching of an (N–1)-th pressure boundary is sensed by an (N–1)-th sensor mounted to the (N–1)-th section, and in a case in which a last section is filled with the gas, the gas is discharged to stop a function of the battery.

7. The battery cell according to claim 5, wherein the sensor is connected to an alarm member, and in a case in which the signal deviates from a predetermined value, the sensor transmits the signal to the alarm member.

8. The battery cell according to claim 1, wherein the partitioning wall is made of a material configured to be more easily damaged than an outer wall of the battery case when the partitioning wall is expanded by the gas.

9. The battery cell according to claim 4, wherein the partitioning wall is made of a material configured to be more easily deformed than an outer wall of the battery case when the partitioning wall is expanded by the gas.

10. The battery cell according to claim 9, further comprising a reduction portion configured not to allow gas to be introduced therein and configured such that a volume of a space therein is reduced due to deformation of the partitioning wall.

11. The battery cell according to claim 10, wherein the second sealed portion has a second one-way valve configured to move a material from the reduction portion to the reception unit.

12. The battery cell according to claim 10, wherein the second sealed portion has an expansion portion, the reduction portion having a larger volume than a volume of the expansion portion before generation of the gas, such that the volume of the expansion portion is configured to be increased due to deformation of the partitioning wall when the gas is introduced therein.

13. A battery pack comprising the battery cell according to claim 1.

14. A device comprising the battery pack according to claim 13 as a power source.

15. The device according to claim 14, wherein the device is a mobile electronic device, a power tool driven by a battery-powered motor, an electric automobile, an electric two-wheeled vehicle, an electric golf cart, or a power storage system.

16. A method of detecting a gas pressure in a gas storage unit of a battery case of a battery cell, the method comprising:

providing an electrode assembly in a reception unit of the battery case together with an electrolytic solution, and providing the gas storage unit in the battery case outside the reception unit, the gas storage unit having first and second partitioning walls therein that partition a space defined in the gas storage unit into three or more sections;

generating a gas within the reception unit; and rupturing the first partition wall when a gas pressure in a first one of the three or more sections in the gas storage unit exceeds a first limit pressure, so that the gas flows from the first one of the three or more sections into a second one of the three or more sections; and rupturing the second partition wall when a gas pressure in a second one of the three or more sections in the gas storage unit exceeds a second limit pressure greater than the first limit pressure, so that the gas flows from the second one of the three or more sections into a third one of the three or more sections, wherein the first and second partitioning walls each do not comprise an opening prior to the rupturing of the first partitioning wall and the second partitioning wall, wherein the gas storage unit is disposed at an outer surface of the battery case and has first and second sensors each configured to generate a signal based on deformation or rupture of the first and second partitioning walls, respectively, and wherein each of the first and second sensors is at least one of a contact sensor or a pressure sensor.

17. The method according to claim 16, further comprising discharging the gas out of the battery case when a gas pressure within a last one of the two or more sections defined in the gas storage unit becomes greater than or equal to a predetermined discharge pressure.

18. The method according to claim 16, further comprising reducing a volume of a space within a reduction portion of the gas storage unit when the partition wall is deformed, the reduction portion being configured not to allow the gas to be introduced therein.

19. The method according to claim 18, further comprising increasing a volume of a space within an expansion portion of the gas storage unit when the partition wall is deformed, the reduction portion having a larger volume than a volume of the expansion portion before the gas is generated.

* * * * *